US006662007B2

(12) United States Patent
Yuen

(10) Patent No.: US 6,662,007 B2
(45) Date of Patent: *Dec. 9, 2003

(54) CORDLESS PHONE BACK LINK FOR INTERACTIVE TELEVISION SYSTEM

(75) Inventor: Henry C. Yuen, Redondo Beach, CA (US)

(73) Assignee: E-Guide, Inc., Beverly Hills, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1 day.

This patent is subject to a terminal disclaimer.

(21) Appl. No.: 09/247,350

(22) Filed: Feb. 10, 1999

(65) Prior Publication Data

US 2002/0098834 A1 Jul. 25, 2002

Related U.S. Application Data

(63) Continuation of application No. 08/914,336, filed on Jul. 14, 1997, now Pat. No. 5,898,919, and a continuation of application No. PCT/US97/02888, filed on Feb. 26, 1997.
(60) Provisional application No. 60/012,303, filed on Feb. 26, 1996, provisional application No. 60/012,968, filed on Mar. 7, 1996, and provisional application No. 60/027,671, filed on Oct. 7, 1996.

(51) Int. Cl.[7] .................. H04M 3/00; H04M 11/00; G09G 5/00; H04N 11/00; H04L 12/28
(52) U.S. Cl. .................. 455/419; 379/90.1; 345/721; 348/460; 370/261; 380/211; 713/401; 725/110
(58) Field of Search .................. 455/420, 419; 379/110, 90.01; 348/1, 12, 622, 7, 460; 358/86; 359/146; 380/9, 211; 725/110; 345/721; 370/261; 713/401

(56) References Cited

U.S. PATENT DOCUMENTS 3,891,792 A  *  6/1975  Kimura ............... 348/622
4,068,264 A  *  1/1978  Pires (List continued on next page.)

FOREIGN PATENT DOCUMENTS

WO      WO96/13933      5/1996
WO      WO 97/31480      8/1997

OTHER PUBLICATIONS

Schooneveld, "Standardization of Conditional Access Systems for Digital Pay Television", Phillips Journal of Reasearch, Volumn 50, 1996.*

(List continued on next page.)

Primary Examiner—William Cumming
(74) Attorney, Agent, or Firm—Christie, Parker & Hale, LLP

(57) ABSTRACT

A system for communicating information from a television viewer to a central site includes a remote control unit for sending command signals from the viewer to a television or video cassette recorder (VCR). Circuitry integral with the television or VCR accepts the command signals from the remote control unit and interprets the signals to form a viewer command, such as a purchase command, to be communicated to the central site. The circuitry automatically sends dual-tone multifrequency (DTMF) tone signals representing the command over a radio frequency (RF) link to a cordless telephone base unit, which is connected to the central site by a public switched telephone network. The cordless telephone base unit initiates a telephone call to the central site and communicates the DTMF tone signals received from the DTMF circuitry in the television or VCR to the central site. The television or VCR receives a television signal and extracts information related to a product or pay-per-view (PPV) event being advertised on a television program from the vertical blanking interval of the television signal. This information includes the telephone number of the central site used for making the telephone connection as well as identification information for the product or PPV event to be purchased.

9 Claims, 7 Drawing Sheets

U.S. PATENT DOCUMENTS

| | | | | |
|---|---|---|---|---|
| 4,536,791 | A | * | 8/1985 | Campbell et al. |
| 4,751,578 | A | * | 6/1988 | Reiter et al. |
| 4,965,825 | A | * | 10/1990 | Harvey et al. ................. 380/9 |
| 5,014,125 | A | * | 5/1991 | Pocock et al. ................. 348/7 |
| 5,138,649 | A | * | 8/1992 | Krisberg et al. ............. 359/146 |
| 5,155,590 | A | * | 10/1992 | Beyers, II et al. ............. 358/86 |
| 5,388,101 | A | * | 2/1995 | Dinkins |
| 5,530,469 | A | * | 6/1996 | Garfinkle ....................... 348/1 |
| 5,570,295 | A | * | 10/1996 | Isenberg et al. ......... 379/90.01 |
| 5,570,415 | A | | 10/1996 | Stretton et al. ............. 379/110 |
| 5,592,551 | A | * | 1/1997 | Lett et al. .................... 380/211 |
| 5,640,192 | A | * | 6/1997 | Garfinkle .................... 725/116 |
| 5,671,267 | A | * | 9/1997 | August et al. ............... 379/110 |
| 5,729,532 | A | * | 3/1998 | Bales et al. ................. 370/261 |
| 5,784,597 | A | * | 7/1998 | Chiu et al. .................. 713/401 |
| 5,898,919 | A | * | 4/1999 | Yuen .......................... 455/420 |
| 5,903,262 | A | * | 5/1999 | Ichihashi et al. ........... 725/110 |
| 5,946,026 | A | * | 8/1999 | Suzuki |
| 6,075,527 | A | * | 6/2000 | Ichihashi et al. ........... 345/721 |
| 6,195,548 | B1 | * | 2/2001 | Schultheiss ................. 455/419 |
| 6,285,407 | B1 | * | 9/2001 | Yasuki et al. ............... 348/460 |

OTHER PUBLICATIONS

Rath, "Set–Top Box Control Software: A Key Component in Digital Video", Phillips Journal of Research, Volumn 50, 1996.*

Richard G. Merrell et al, "An Auto–Dialer Approach to Pay–Per–View Purchasing," 1989 NCTA Technical Papers Series, pp. 34–64.

PCT Written Opinion dated Mar. 2, 1998 in corresponding PCT case (PCT/US97/02888).

Response to Written Opinion dated Apr. 30, 1998 in corresponding PCT case (PCT/US97/02888).

* cited by examiner

CORDLESS PHONE BACK LINK FOR INTERACTIVE TELEVISION SYSTEM

CROSS-REFERENCE TO RELATED APPLICATIONS

This application is a continuation of U.S. application Ser. No. 08/914,336, filed Jul. 14, 1997, now U.S. Pat. No. 5,898,919, which claims the benefit of U.S. Provisional Application No. 60/012,303, filed Feb. 26, 1996; U.S. Provisional Application No. 60/012,968, filed Mar. 7, 1996; U.S. Provisional Application No. 60/027,671, filed Oct. 7, 1996; and International Publication Number W097/31480, published Aug. 28, 1997 PCT Application No. PCT/US97/02888, filed Feb. 26, 1997.

FIELD OF THE INVENTION

This invention relates generally to television and telephone systems and more specifically to an interactive television system integrated with cordless phone circuitry to allow automatic telephonic communication between the interactive television system and a central site.

BACKGROUND OF THE INVENTION

An emerging trend in the marketing of cable television and digital satellite systems (DSS) is to emphasize Pay-Per-View (PPV) television programming as a source of revenue. An ideal PPV television system should allow a viewer to purchase the right to watch a television program such as a movie, sporting event, or other special event through a minimal amount of effort on the part of the viewer. For example, after watching a short preview or advertisement of a PPV program, the viewer could gain access to the PPV program simply by pressing a selected button on the viewer's remote control unit for a television or video cassette recorder (VCR). In another example, the viewer is watching an informational commercial ("infomercial") or a home shopping program and the viewer desires to purchase an advertised product by pressing a selected button on the remote control unit. In existing television systems, in order for the viewer to arrange for PPV program access, the viewer must go to the viewer's telephone, call the PPV program provider (such as the cable company) and enter his or her cable box serial number, credit card number and PPV program identifier. The PPV program provider then enables the cable box to display the selected PPV program to the viewer. In the home shopping situation, the viewer must write down the advertiser's telephone number and product identifier, go to the telephone, call the advertiser or a home shopping service provider, and then communicate the required credit card and product selection information to an operator.

In more recent systems using digital set top boxes (such as DSS), the set top box itself is directly connected to a telephone line in the viewer's home and the remote control unit includes a button for ordering a PPV program. When the button is pushed by the viewer, the telephone number of the PPV program provider is automatically dialed and the box identifier and PPV program identifier are automatically transmitted over the telephone connection to the PPV program provider. In this scenario, the viewer must establish a credit card account with the PPV program provider for billing purposes prior to pushing the button to select a PPV program. A major drawback to effective operation of these systems is the requirement that the set top box and television must be close to a telephone jack in the viewer's home, because of the direct connections by wire between the set top box, the television and the telephone jack. In many homes, the television is not in close proximity to a telephone jack, nor even in the same room, thereby rendering such systems unsuitable for widespread use. An interactive television system overcoming this drawback would have considerable value in the PPV, home shopping, and other interactive viewing situations.

SUMMARY OF THE INVENTION

A system for communicating information from a television viewer to a central site includes a remote control unit for sending command signals from the viewer to a television or video cassette recorder (VCR). Circuitry integral with the television or VCR accepts the command signals from the remote control unit and interprets the signals to form a viewer command, such as a purchase command, to be communicated to the central site. The circuitry automatically sends dual-tone multifrequency (DTMF) tone signals representing the command over a radio frequency (RF) link to a cordless telephone base unit which is connected to the central site by a public switched telephone network. The cordless telephone base unit initiates a telephone call to the central site and communicates the DTMF tone signals received from the DTMF circuitry to the central site. Because of the advantages of RF communication, the television or VCR does not have to be in the same room as, or in close proximity to the cordless telephone base unit. The television receives a television signal and extracts information related to a product being advertised on a television program from the vertical blanking interval of the television signal. This information may include the telephone number of the central site used for making the telephone connection as well as identification information for products. A cordless telephone handset in communication with the cordless telephone base unit is also included to allow the television viewer or other user to make normal telephone calls with the cordless telephone.

In an embodiment of the present invention, a method of purchasing a product advertised on a program displayed by a television includes reception of a purchase command by a remote control unit of the television, transmission of the purchase command over an infrared link to the television, and initiation of a telephone connection by a cordless telephone base unit to a central site. The purchase command is then sent by dual-tone multifrequency signal generation circuitry resident in the television over a radio frequency link to the cordless telephone base unit. The cordless telephone base unit sends the purchase command to the central site over the telephone connection. The central site then processes the purchase command.

In another embodiment of the present invention, the circuitry for sending the DTMF tone signals is included in the remote control unit instead of the television. In this embodiment, when the viewer pushes a button on the remote control unit to communicate information such as a purchase command to the central site, the remote control unit directs the DTMF circuitry to send the DTMF tone signals representing the viewer's command to the cordless telephone base unit. These DTMF tone signals are then forwarded over the telephone connection to the central site. In this embodiment, the television still extracts information from the vertical blanking interval of the television signal, but the extracted information is transmitted to the remote control unit for processing.

Still other objects and advantages of the present invention will become readily apparent to those skilled in the art from the following detailed description, wherein is shown and described only the preferred embodiment of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE PREFERRED EMBODIMENT

The present invention is a back link system connecting a television, VCR, or other device (hereafter denoted as "television"), heretofore primarily designed to only receive information from a central site, to a cordless telephone base unit by enabling the television to operate certain functions of a cordless telephone handset. The present invention includes the functionality of the cordless telephone handset in the television, thereby enabling the television to directly initiate a telephone call through the cordless telephone base unit and to send selected information from a viewer or user via the telephone connection over the public switched telephone network to a central site.

Figure 1:
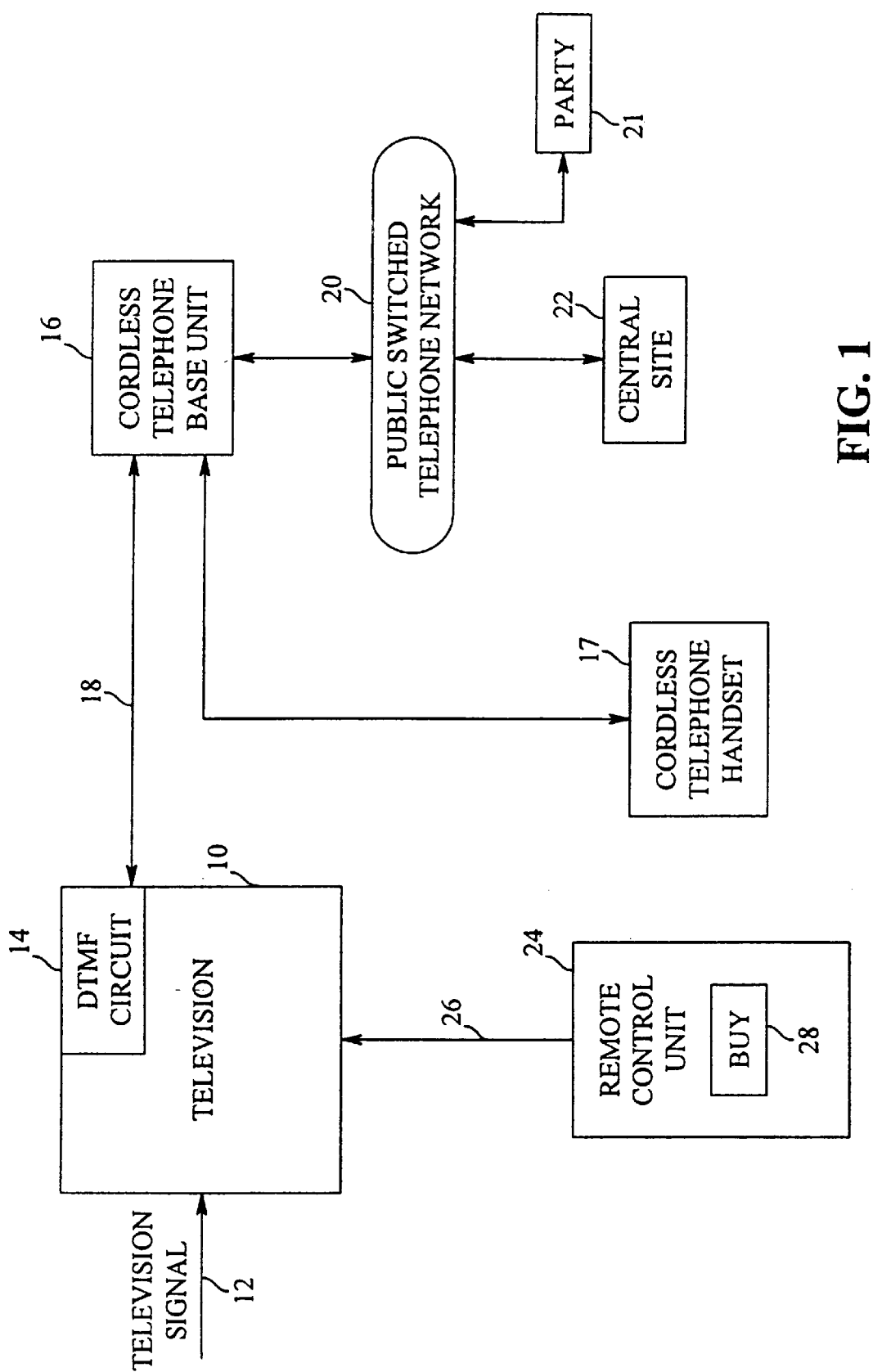
FIG. 1 is a block diagram of the present invention.

FIG. 1 is a block diagram of the present invention. Television 10 receives a Television Signal 12 from a signal source. The Television 10 could be a standard television, a VCR, or any other device capable of tuning television signals. The Television Signal may be received from an antenna, a cable, a satellite signal, or any other transmission medium for television signals. The Television 10 includes a Dual-Tone Multifrequency (DTMF) Circuit 14.

The DTMF Circuit 14 is similar to the corresponding portion of a well known cordless telephone handset. However, the DTMF Circuit does not include such typical handset features as a microphone, loudspeaker, ringer speaker, volume control, on/off switch, hold key, mute key, push button keypad, and rechargeable battery, because the DTMF Circuit does not directly interact with a user of the telephone. Hence, the manufacturing cost of the DTMF Circuit can be kept quite low in comparison to the typical cordless telephone handset. Note that the primary purpose of the DTMF Circuit is to transmit DTMF tone signals to a pre-existing Cordless Telephone Base Unit 16. It is not necessary that the DTMF circuit transmit voice signals or receive voice or DTMF tone signals. The pre-existing Cordless Telephone Base Unit 16 may be in communication with a standard Cordless Telephone Handset 17. The Base Unit-Handset combination may be used by the television viewer or other user to make telephone calls in the normal way. The DTMF tone signals are used to dial the telephone and to transmit alphanumeric data needed to complete a viewer transaction such as the purchase of a product or a PPV television program.

Note that the present invention uses a pre-existing cordless telephone having a base unit and a handset to form a two-way transmission link with a television. The Cordless Telephone Base Unit 16 performs not only its conventional function of a transmission link between the public switched telephone network and the Cordless Telephone Handset 17, but also a transmission link between the public switched telephone network and the Television 10. In other words, the Cordless Telephone Base Unit performs two functions.

The DTMF system uses internationally standardized combinations of frequencies. Alphanumeric characters are encoded in the form of two pairs of tones for transmission via the telephone lines. In conventional DTMF signaling, the numbers and symbols present on a telephone keypad are each transmitted as a dual-frequency tone. For example, the number "1" is represented by a tone comprised of the frequencies 697 Hz and 1209 Hz, and the star symbol "*" is represented by a tone at the frequencies 852 Hz and 1477 Hz. A total of seven different frequencies are utilized in pairs to transmit the ten numbers and two symbols on a conventional telephone keypad. In some systems, four additional characters are provided. Table I is a matrix showing the high and low frequency pairs, in Hz, required for each of the 16 possible characters. Each character is represented by a dual set of audio frequency signals, which when transmitted together are recognized as the unique representation of the character.

TABLE 1

| Lower Frequency (Hz) | Higher Frequency 1209 | Higher Frequency 1336 | Higher Frequency 1446 | Higher Frequency 1633 |
| --- | --- | --- | --- | --- |
| 697 | 1 | 2 | 3 | A |
| 770 | 4 | 5 | 6 | B |
| 852 | 7 | 8 | 9 | C |
| 941 | * | 0 | # | D |

To transmit alphabetic characters over the telephone lines as well as the conventional numbers and symbols, the seven standard frequencies 697 Hz, 770 Hz, 852 Hz, 941 Hz, 1209 Hz, 1336 Hz, and 1447 Hz are used, and an eighth frequency, normally unused, is also employed. The eighth frequency has a value of 1633 Hz. The additional frequency is used only for transmission of characters that are not typically transmitted via DTMF signaling. To indicate the transmission of an alphabetic character, the first tone in a pair of tones which identify the letter includes the eighth frequency as a component thereof. Each letter is comprised of a first tone which includes the eighth frequency in combination with one of the seven conventionally employed frequencies, followed by a second tone comprised of any two of the eight available frequencies. Similarly, other non-conventional characters, such as punctuation and spaces, are transmitted by generating a unique pair of dual-frequency tones.

The DTMF Circuit may be enhanced to also provide DTMF reception capabilities, however, voice reception is not needed. With this feature, it can be determined whether a dial tone is available on the telephone line, that the line is not busy, or that confirmation data concerning a transaction is received.

Figure 2:
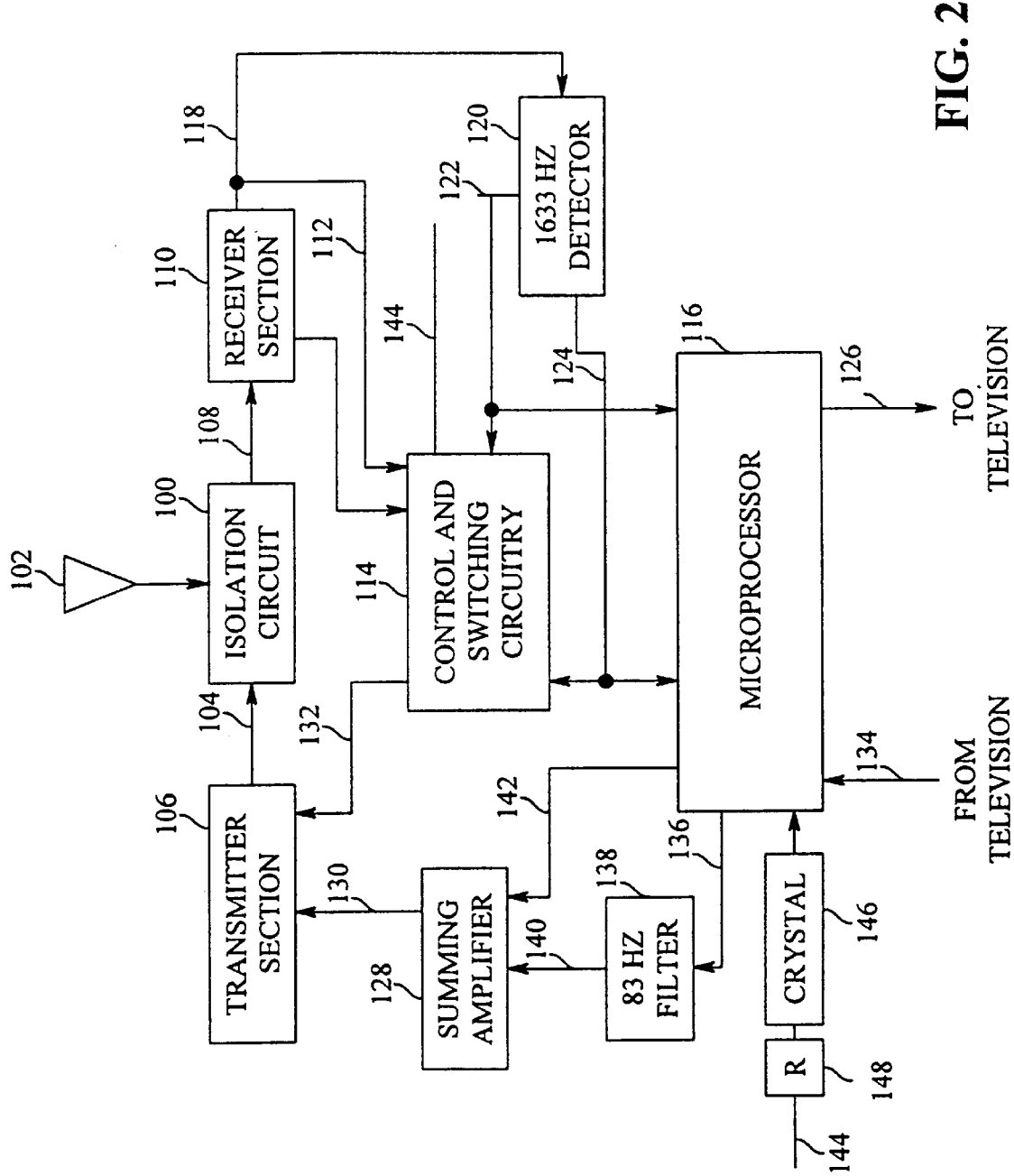
FIG. 2 is a schematic diagram of the DTMF Circuit.

FIG. 2 is a schematic diagram of the DTMF Circuit 14. An Isolation Circuit 100 is provided which is connected to Antenna 102 and which is connected through Line 104 to the output of a Transmitter Section 106 and also through Line 108 to the input of an optional Receiver Section 110. A voltage supply input of the Receiver Section 110 is connected through Line 112 to Control and Switching Circuitry 114, which is connected to Microprocessor 116 to control operation of the Receiver Section 110. The output of the Receiver Section 110 is connected to Line 118, which is connected to an input of 1633 Hz Detector 120. The output of 1633 Hz Detector 120 is applied through Line 122 to Control and Switching Circuitry 114. A control input to the 1633 Hz Detector 120 is connected through Line 124 to an output of the Microprocessor 116, which is also connected to Control and Switching Circuitry 114. Microprocessor 116 includes a tone generator which may be a standard type of DTMF integrated circuit. When a 1633 Hz signal is produced at the output of the Receiver Section 110 and detected by 1633 Hz Detector 120, the Microprocessor 116 operates to engage communications with Television 10 over Line 126. DTMF tones received by Receiver Section 110 are applied through Line 112 to Control and Switching Circuitry 114, wherein the DTMF tone signals are converted to digital signals. The digital signals are sent thereafter to Microprocessor 116 for eventual transmission to Television 10 over Line 126.

To transmit DTMF tone signals from the DTMF Circuit 14 to the Cordless Telephone Base Unit 16, a Summing Amplifier 128 is provided which has an output connected through Line 130 to Transmitter Section 106 to frequency modulate the output of the Transmitter Section. Control inputs of the Transmitter Section 106 are connected through Line 132 to the Control and Switching Circuitry 114. The Microprocessor receives digital signals for transmission over Line 134 from the Television 10. The Microprocessor operates to apply a 83 Hz square wave signal through Line 136 to 83 Hz Filter 138, which is connected through Line 140 to an input of Summing Amplifier 128. The output of the Transmitter Section is then modulated to send out a substantially sinusoidal 83 Hz burst which signals the Cordless Telephone Base Unit 16.

After a 83 Hz burst is sent, the Microprocessor 116 develops a 98 Hz coded signal on Line 142 which is applied as a second input of the Summing Amplifier 128. The coded signal is detected by the Cordless Telephone Base Unit and, if properly received, the Cordless Telephone Base Unit develops a 1633 Hz "handshake" signal which is transmitted back to the DTMF Circuit to be detected by 1633 Hz Detector 120. Then the Microprocessor 116 operates to develop a 98 Hz coded null signal on Line 142 for transmission by the Transmitter Section 106. If the null signal is properly detected by the Cordless Telephone Base Unit, the transmission of the 1633 Hz "handshake" signal is terminated and the Microprocessor responds to the termination of the "handshake" signal by developing another coded signal on Line 142 for transmission, the sequence being repeated until communications are deemed to be effectively established. Power for the DTMF Circuit is supplied by the Television 10 over Line 144. Clock circuitry of the Microprocessor 116 is connected to a Crystal 146 through a Resistor 148 to power Line 144.

The Cordless Telephone Base Unit 16 then operates to connect to an outside telephone line and to allow transmission of a dial tone back to the DTMF Circuit 14. The DTMF tone signals for the telephone number to be dialed are then transmitted from the Microprocessor 116 to the Cordless Telephone Base Unit 16 and the Cordless Telephone Base Unit establishes the telephone connection. DTMF tone signals representing viewer transaction information may now be sent from the Television 10 to the Central Site 22 through the Cordless Telephone Base Unit 16 and Telephone Line 20.

In an alternate embodiment, the DTMF Circuit could be set up to be compatible with a viewer's existing cordless telephone base unit. Some cordless telephones include digital code security to prevent other handsets from communicating with the base unit. The handset and base unit of the cordless phone share a digital code. The DTMF Circuit 14 could be set up to receive and use this code (using learning remote or stored setup data methods) much like universal infrared remote controllers. Alternatively, it is foreseen that cordless telephone manufacturers may include a code that when received by the Cordless Telephone Base Unit 16, would disable this security feature. Accordingly, the DTMF Circuit could be set up to transmit the disable code specific to the Cordless Telephone Base Unit, again using learning remote or stored setup data methods.

Referring back to FIG. 1, DTMF Circuit 14 and Cordless Telephone Base Unit 16 communicate over a plurality of communication channels via radio frequency (RF) link 18. Hence, the DTMF Transmitter and the Cordless Telephone Base Unit each include an antenna (not shown in FIG. 1) for transmission and reception of RF signals. Full duplex communication between the Cordless Telephone Base Unit 16 and the DTMF Circuit 14 is obtained by frequency modulation and demodulation of signals on FCC-designated channels. The RF link may be implemented as a 900 MHz Digital Spread Spectrum communication path, as is provided, for example, by the circuitry contained in the model CLT-926 cordless telephone commercially available from Sanyo Consumer Electronics. Spread spectrum is a modulation technique in which the information content of a modulated wave form is spread over a wider bandwidth than that of the original information signal. A spread spectrum system takes an input signal, mixes it with FM noise and "spreads" the signal over a broad frequency range, hopping from frequency to frequency at split-second intervals. The spread signal has a greater bandwidth than the original message and is less likely to interfere with other signals.

A general overview of spread spectrum technology is provided by R. C. Dixon, *Spread Spectrum Systems,* published by John Wiley & Sons, New York, N.Y., 1984. One type of spread spectrum modulation is frequency hopping. According to Dixon, a frequency hopping system or "frequency hopper" consists of a code generator and a frequency synthesizer capable of responding to the coded output from the code generator. Also, according to Dixon, "frequency hopping" modulation is more accurately termed "multiple-frequency, code-selected, frequency shift keying." It is simply frequency shift keying (FSK) except that the set of frequency choices is greatly expanded. Simple FSK most often uses only two frequencies; for example, F1 is sent to signify a "mark," F2 to signify a "space." Frequency hoppers, on the other hand, often have thousands of frequencies available. The number of frequency choices and the rate of hopping from frequency to frequency in any frequency hopper is governed by the requirements placed on it for a particular use. Cordless telephone sets designed to operate in a frequency hopping system are now widely available from manufacturers such as Lucent Technologies, Motorola, Sharp, and others.

By using digital spread spectrum communications, RF link 18 exhibits superior noise immunity, longer operating range, automatic best channel selection, and superior security against eavesdropping. However, RF Link 18 may also be implemented by cordless telephone circuitry operating over a selected one of 10 channels allocated in the 46–50 MHz FCC-allocated frequency band.

Instead of being integral with the Television 10, the DTMF Circuit 14 could also be a stand-alone unit, i.e. a "set top box", which is directly connected into a telephone jack of a DSS or into a digital cable box.

The Cordless Telephone Base Unit 16 may or may not be located in the same room as the Television 10 and DTMF Circuit 14. For effective operation, the distance between the Cordless Telephone Base Unit and the DTMF Circuit may extend up to several hundred feet, which is more than adequate for residential applications. The Cordless Telephone Base Unit 16 is arranged to be connected to at least one telephone line and also to a 120-volt alternating current (AC) line cord (not shown) for plugging into a standard electrical outlet. Alternatively, the connection to the public switched telephone network can be via a cellular network. The Cordless Telephone Base Unit 16 may include one or more control and signaling buttons (not shown). An exemplary embodiment of the Cordless Telephone Base Unit is shown in U.S. Pat. No. 4,706,274, issued to Baker et al., entitled "Cordless Telephone System" and incorporated herein by reference. The Cordless Telephone Base Unit may include such features as a built-in speaker, microphone, line select button, hold button, intercom call switch, answer button, volume control knob, and various lights to indicate such events as power availability, incoming calls and hold status. The Cordless Telephone Base Unit would not necessarily have to include a receptacle for a cordless telephone handset because portions of the typical telephone handset are integral with the Television 10; thus there may be no need for such a receptacle. For similar reasons, the Cordless Telephone Base Unit would not have to include a portable handset battery recharger. However, pre-existing Cordless Telephone Base Unit 16 could be employed without modification with pre-existing Cordless Telephone Handset 17 to make telephone calls in the usual way. In other words, Cordless Telephone Base Unit 16 can perform dual functions—serve as a standard telephone for two way voice transmission and serve as a data transmission link from a television to a telephone network.

The Cordless Telephone Base Unit 16 could also be used as an answering telephone completely independent of the DTMF Circuit 14. To receive a call at the Cordless Telephone Base Unit, an answer button (not shown) is pressed and the Cordless Telephone Base Unit operates as a conventional "speaker phone."

The Cordless Telephone Base Unit 16 is coupled via public switched telephone network 20 with Central Site 22. The Central Site includes components to answer the incoming telephone call, receive the transaction data from the Cordless Telephone Base Unit, implement the transaction, and send confirmation data back to the Television. The Central Site represents the centrally located PPV program provider, cable company, or broadcast television station or network. Typically, the Central Site will include a well known general purpose computer system and associated circuitry for performing the above functions.

The Cordless Telephone Base Unit 16 can also communicate with other telephones such as Party 21 through the public switched telephone network 20.

In the preferred embodiment of the present invention, PPV or home shopping control information is embedded in the television signal at the Central Site 22 or other location and extracted from the Television Signal 12 by the Television 10 (the extraction and control capability may also be included in a VCR or other appliance). One method of embedding the information into the television signal is to embed the information in the vertical blanking intervals (VBIs) of the Television Signal. The vertical blanking intervals can contain closed caption data for the hearing impaired and extended data services (EDS) data.

Video images in a cathode ray tube (CRT) video device, e.g. television, are generated by scanning a beam along a predefined pattern of lines across a screen. Each time all of the lines are scanned, a frame is said to have been produced. In the National Television Standards Committee (NTSC) implementation, such as is used in the United States, a frame is scanned 30 times per second. Each television frame comprises 525 lines which are divided into two separate fields, referred to as field 1 ("odd field") and field 2 ("even field"), of 262.5 lines each. Accordingly, these even and odd fields are transmitted alternately at 60 Hz. The lines of the even and odd fields are interleaved to produce the full 525 line frame once every $\frac{1}{30}$ of a second in a process known as interlacing. Another standard in the world uses 625 lines of information and interlace 312 and 313 lines at 50 fields per second. In the 525 line NTSC standard used in the United States, approximately 480 lines are displayed on the television screen.

The interlacing scanning pattern of a conventional television receiver includes scanning the CRT beams from the top left corner horizontally across the screen. After the first, topmost line is scanned, the beam returns to the left side during a period of time known as the horizontal blanking interval and repeats scanning along another line which is parallel to but lower than the previous line. The scanning continues along the lines until the beam reaches the center of the bottom part of the screen to complete field 1.

From the bottom of the screen, the beam returns to the top where it starts scanning from substantially the center of the screen along the lines for field 2 which interlace the lines of field 1. This is not an instantaneous bottom to top jump but actually requires the length of time to scan 21 horizontal lines. These lines are lines 1 through 21 of field 2. The second half of line 21, field 2 is displayed. Then lines 285 to 525 of fields 2 are scanned to complete field 2. When the beam reaches the bottom right corner of the screen, the picture frame is formed. The beam then retraces to the top.

During the time in which the beam returns from the bottom to the top of the screen between the fields, it carries no video or picture signals because it does not produce any picture element on the screen. This time interval is generally known as the vertical blanking interval (VBI). Its duration is typically 21 times the time duration that it takes the beam to scan across the screen. Apparatus and methods using the NTSC standard with 21 lines in each VBI are well known in the art and therefore are not discussed in further detail herein.

Because no image is produced on the display during the VBI, no picture information needs to be carried by the television broadcast signals. Thus, the VBI is used for conveying auxiliary information from a television network or station to viewers. For example, closed caption data associated with the television program are transmitted as encoded composite data signals in VBI line 21, field 1 of the standard NTSC video signal. Lines 1 through 9 of the VBI of each field are used for vertical synchronization and post equalizing pulses. Hence, lines 10 through 21 are available for carrying auxiliary information.

Figure 3:
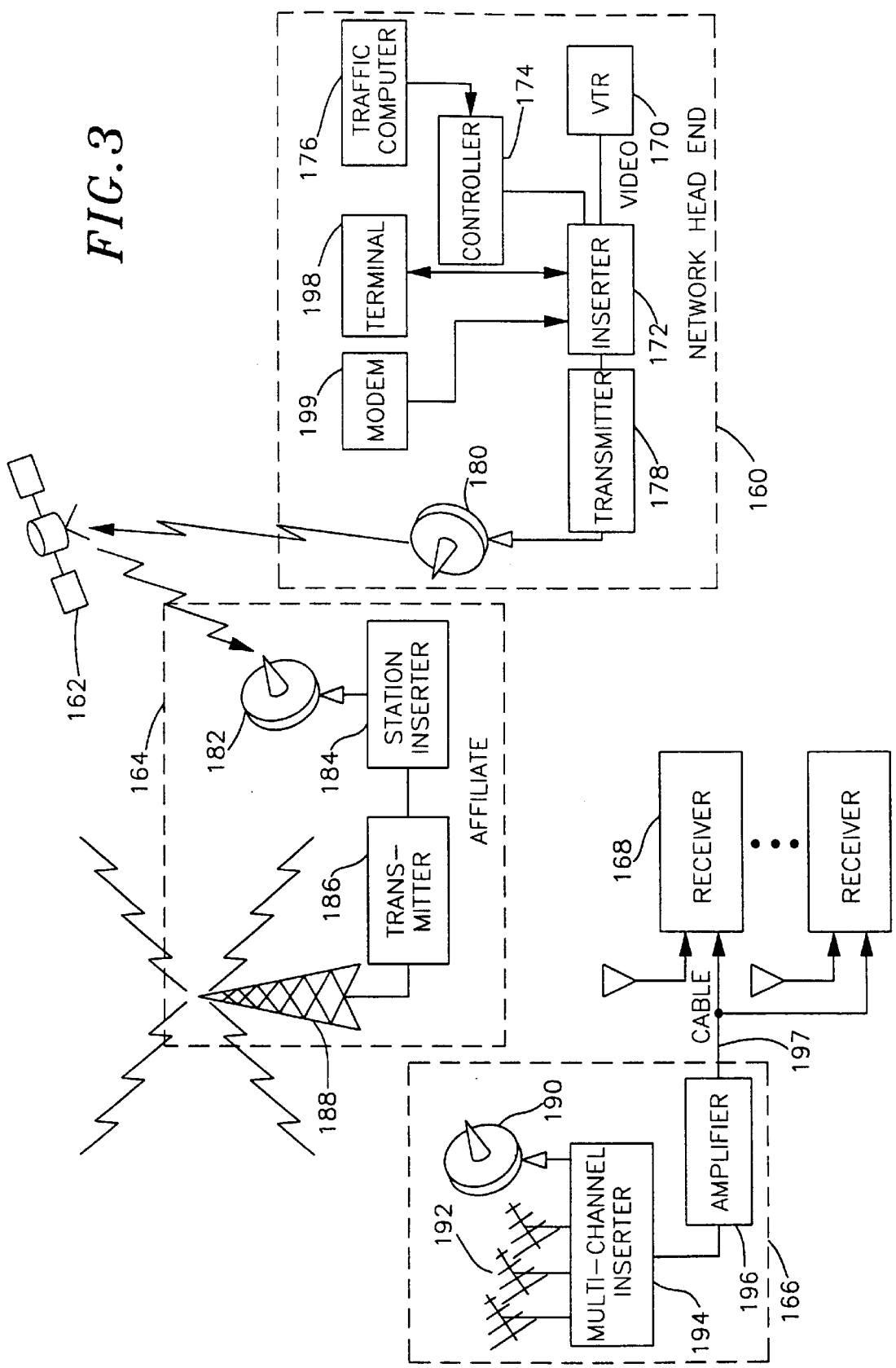
FIG. 3 is a functional block diagram of a data transmission system for television signals.

FIG. 3 is a functional block diagram of a data transmission system for television signals. As used herein, the terms "broadcast" and "transmit" are used interchangeably for the transmission of signals over cable or fiber optics, to or from satellites, over the air, and the like. The data transmission system is the source for the Television Signal 12 received by the Television 10 of FIG. 1. A Network Head End 160 transmits a composite television signal containing inserted information in a portion thereof, typically the vertical blanking interval, to a Satellite 162 which rebroadcasts the same to a local Affiliate 164. The Affiliate 164 may further insert data into the VBI of the received television signal and transmit the same to a local Cable Head End 166. The Cable Head End 166 receives television signals from a plurality of sources (including satellites) and may further insert data into the VBI of any of the television signals. The signals from the plurality of sources are combined into a composite television signal, amplified, and provided over a cable to a plurality of individual Receivers 168. In the preferred embodiment, Television 10 from FIG. 1 is an example of a Receiver 168, however, Receivers can include cable boxes, VCRs, and satellite receivers as well as televisions. In addition, the individual Receivers 168 may receive signals directly from local Affiliate 164 by air, which may include the use of a Satellite 162, or by cable.

More specifically, the Network Head End 160 has a video tape recorder (VTR) 170 for providing a program signal to an Inserter 172. A Controller 174, also at the head end controls the scheduling of loading tapes from a cart (e.g., a machine with a plurality of video tape cassettes which are moved by a robotic arm from a storage location and inserted into a VTR and vice versa). Furthermore, the Controller 174 controls the lighting of stages during live television broadcasts, such as news broadcasts. The Controller 174 is typically a microprocessor-based system. A Traffic Computer 176 controls the exact timing of playing individual segments of video tapes and inserting commercials therebetween as well as switching between different programs. Some Network Head Ends 160 have both a Traffic Computer 176 and a Controller 174.

The Controller 174 provides data and commands to the Inserter 172. The Traffic Computer 176 provides data and commands to the Controller, if present. Otherwise, the Traffic Computer provides these signals directly to the Inserter 172. The Inserter 172 inserts data into the VBI of the composite television signal and provides the television signal to a Transmitter 178, which in turn provides the television signal on a microwave carrier to Satellite Dish 180 for transmission to Satellite 162.

The Satellite 162 retransmits the received signal, which is received by a Satellite Dish 182 at the Affiliate 164. The Satellite Dish 182 provides the signal to a Station Inserter 184 at the local Affiliate 164. The Affiliate may also insert data into the composite television signal. The television signal is then provided to a Transmitter 186 and then to a Transmitting Antenna 188.

A local Cable Head End 166 has a plurality of Satellite Dishes 190 and Antennas 192 for receiving signals from a plurality of Network Head Ends 160 and Affiliates 164. The received signal from each of the Satellite Dishes and Antennas is provided to respective inputs of Multi-channel Inserter 194, which can also insert data into the VBI of a received signal. The multi-channel output from the Inserter 194 is amplified in Amplifier 196 and provided over a Cable 197 to individual Receivers 168. Alternatively, the Receivers 168 could receive the broadcast information via antennas or satellite receivers.

Note that the Central Site 22 of FIG. 1 may be located at the Network Head End 160, Affiliate 164, or Cable Head End 166 and be integral with the components depicted in FIG. 3 as Network Head End, Affiliate, and Cable Head End, respectively. Alternatively, the Central Site 22 is located at a location different than the Network Head End, Affiliate, or Cable Head End. In either case, the operator of the Central Site 22 provides information regarding PPV events and home shopping products to be inserted into the VBI of the television signal during broadcast of related advertising segments.

Caption data decoding used in the data transmission system is further described in the following specifications, which are hereby incorporated by reference herein: Title 47, Code of Federal Regulations (CFR), Part 15, as amended by GEN. Docket No. 91-1; FCC 91-119; "CLOSED CAPTION DECODER REQUIREMENTS FOR THE TELEVISION RECEIVERS"; Title 47, CFR Part 73.682(a)(22), Caption Transmission format; Title 47, CFR Part 73.699, FIG. 6; "TELEVISION SYNCHRONIZING WAVE FORM"; Title 47 CFR Part 73.699, FIG. 17a; "LINE 21, FIELD 1 DATA SIGNAL FORMAT"; and PBS Engineering Report No. E-7709-C, "TELEVISION CAPTIONING FOR THE DEAF: SIGNAL AND DISPLAY SPECIFICATIONS."

The extended data services is further described in the Recommended Practice for Line 21 Data Service, Electronics Industries Association, EIA-608 (drafts Oct. 12, 1992 and Jun. 17, 1993), the subject matter of which is hereby incorporated by reference. Under this standard, additional data is provided in line 21, field 2 of the vertical blanking interval. This additional data includes two closed captioning fields, two text mode fields and the extended data services. The extended data includes, among other information, program name, program length, length into show, channel number, network affiliation, station call letters, universal coordinated time (UCT), time zone, and daylight savings time usage. Upstream at the Network Head End 160, the network inserts the program name, the length of the show, the length into the show, the network affiliation, and the UCT. Downstream at the Affiliate 164, the Affiliate inserts the channel number, the time zone, the daylight savings time usage and program names. The Network Head End inserts the data that does not differ for the different Affiliates. PPV event and home shopping product data may be inserted by either the Network Head End 160, the Affiliate 164, or the local Cable Head End 166.

The data may be manually entered from a local Terminal 198. The Terminal 198 may be used to build, recall, or edit information to be used as insertion data. The Terminal 198 typically includes a computer. In addition, Modem 199 may be used to provide data to Inserter 172. The data may be provided manually or automatically from remote sites, such as the Central Site 22. The output of the Inserter 172 is a composite television signal including the PPV event and home shopping data.

Referring back to FIG. 1, the viewer uses Remote Control Unit 24 to send commands to the Television 10 over an infrared link 26. Remote Control Unit 24 includes BUY button 28 which is pushed by the viewer to initiate a purchase transaction. Television 10 receives the BUY command and communicates the request to the DTMF Circuit 14.

Figure 4:
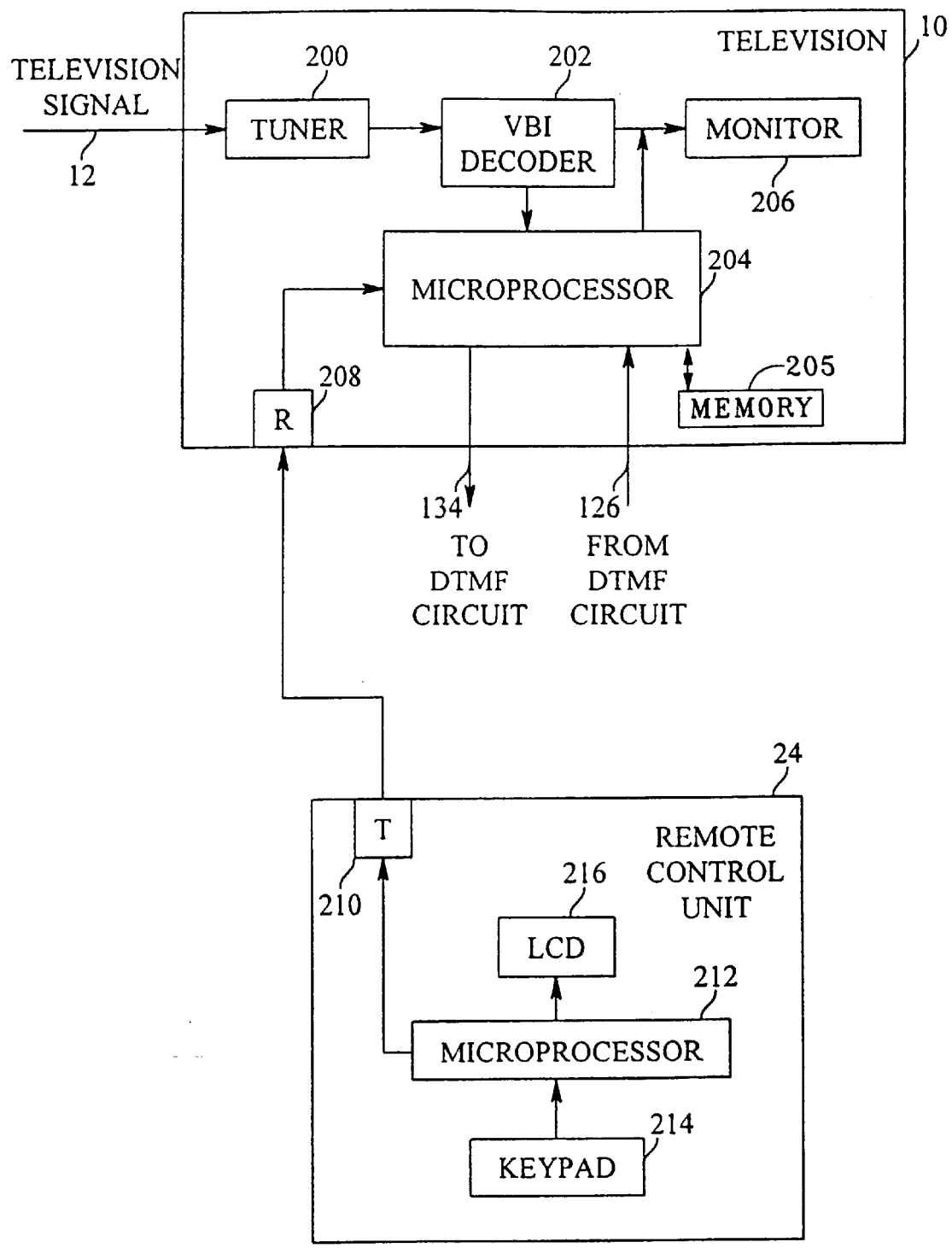
FIG. 4 is a block diagram illustrating the main components of the Television and Remote Control Unit.

FIG. 4 is a block diagram illustrating the main components of the Television 10 and Remote Control Unit 24. Television 10 is capable of decoding the vertical blanking interval lines and using the embedded information to support PPV and home shopping applications. The Television has a Tuner 200 which receives the Television Signal 12 from either an antenna, a cable box, a satellite receiver, or other signal transmission medium. A VBI Decoder 202 is coupled to the output of the Tuner 200. A Microprocessor 204, which implements the Television control logic, receives the output of the VBI Decoder 202. The Microprocessor controls the output of the Television Signal 12 to Monitor 206 for viewing by a viewer. The Microprocessor 204 also communicates with the DTMF Circuit via output Line 134 and input Line 126. The Microprocessor executes programming instructions to support PPV, home shopping, and other applications. Infrared Receiver "R" 208 receives commands and data from Remote Control Unit 24, which are then forwarded to Microprocessor 204 for processing.

Remote Control Unit 24 includes an Infrared Transmitter "T" 210 to send commands and data to Infrared Receiver 208. Microprocessor 212 controls the operation of the Remote Control Unit by accepting input data from Keypad 214, displaying output data on Liquid Crystal Display (LCD) 216, and sending commands and data to the Infrared Transmitter 210 for transmission to the Television 10. Included in the Keypad 214 are keys for selecting specific functions relating to PPV or home shopping applications, such as a "BUY" key, or keys indicating PPV programs or television channels.

In the preferred embodiment of the present invention, program-related information that is embedded in the vertical blanking interval lines of the Television Signal 12 includes a telephone number related to the information that is being broadcast. The telephone number in the program-related information is extracted from the Television Signal by the VBI Decoder 202 and sent to the DTMF Circuit 14 by the Microprocessor 204 for initiating a telephone connection.

Note that the difference between the present invention and the concept wherein a remote control unit is also a telephone is the synchronization and organization of data in the Television 10, which itself may be simultaneously receiving data from the Television Signal 12. This synchronization of data allows the viewer to respond to certain stored or time-sensitive information displayed on the Television (supplied to the Television in either digital or analog form) by pressing keys on the Remote Control Unit 24. The Television 10 then combines the received command information with PPV program or product identification data and telephone numbers for transmission to the Cordless Telephone Base Unit 16 for forwarding to the Central Site 22 for processing.

Figure 5:
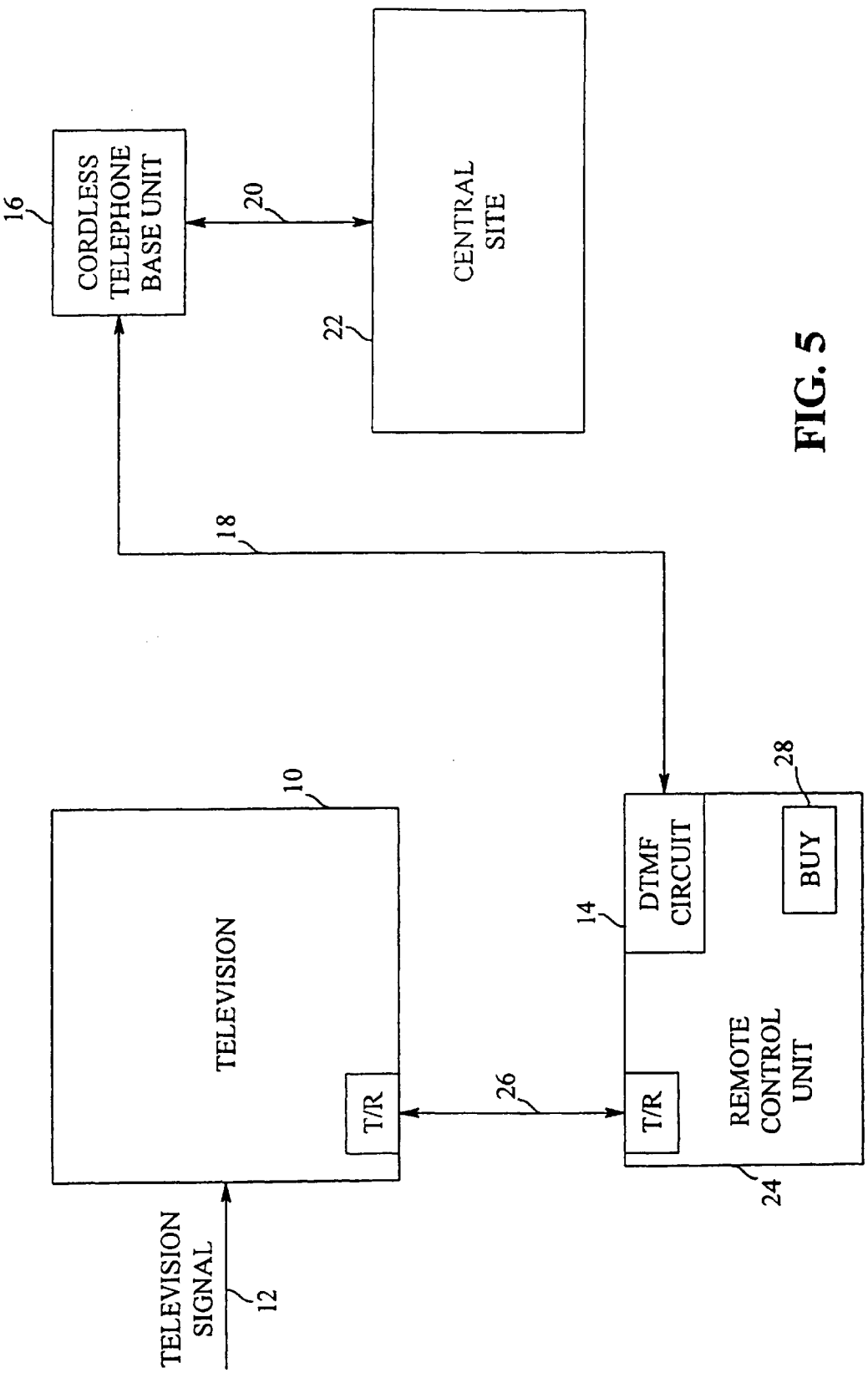
FIG. 5 is a block diagram of an alternate embodiment of the present invention.

FIG. 5 is a block diagram of an alternate embodiment of the present invention. In this embodiment, the DTMF Circuit 14 resides in the Remote Control Unit 24 instead of the Television 10. Two-way communication is now needed between the Television 10 and the Remote Control Unit 24 so that decoded VBI data (such as telephone number and product information) can be forwarded to the Remote Control Unit 24 for processing by the Microprocessor in the Remote Control Unit. In this instance, it is important to identify what PPV program the viewer is purchasing. Separate keys (not shown) can be included in the Remote Control Unit 24 which are labeled with names of PPV programs or services (such as HBO, SHOWTIME, ESPN, etc.). In order to select a PPV program, the viewer presses the key representing a particular service, followed by the BUY key 28. As in FIG. 1, the DTMF Circuit 14 may also include the capability for receiving data. However, since no voice transmission or reception is needed, the circuitry required to implement DTMF transmission and receptions is smaller and simpler than in conventional cordless telephone handsets.

Figure 6:
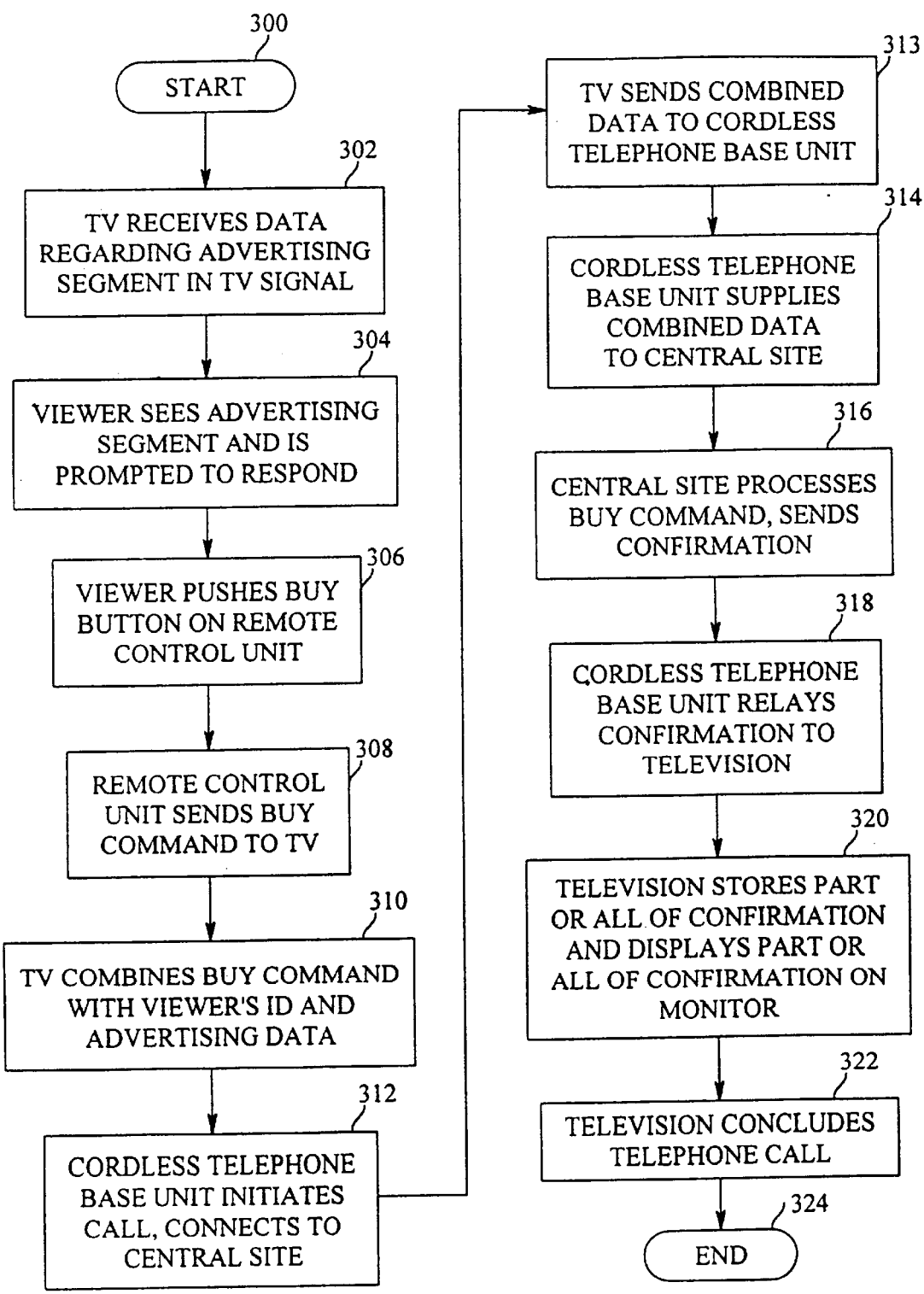
FIG. 6 is a flow chart illustrating the high level operational steps of the present invention.

FIG. 6 is a flow chart illustrating the high level operational steps of the present invention. After Start Step 300, the Television 10 receives data regarding an advertising segment in the vertical blanking interval lines of the Television Signal 12 at Step 302. For example, the advertising segment could contain a preview of an upcoming PPV event or product for sale in a home shopping situation. The embedded data includes a program or product identifier, and the telephone number of the PPV service provider or seller. The advertising segment contains the price of the PPV event or product so the viewer can make an informed decision on whether to purchase the product or the right to view the advertised PPV event. The viewer sees the advertising segment displayed on the Television at Step 304, and is prompted, either audibly or visually, to respond. If the viewer decides to buy, at Step 306 the viewer pushes the BUY button 28 on the viewer's Remote Control Unit 24. Next, at Step 308, the Remote Control Unit 24 sends a signal via Infrared Transmitter 210 to the Infrared Receiver 208 located in the Television 10. The signal includes the unique code for the BUY button, thereby instructing the Microprocessor 204 in the Television that the viewer wants to buy the currently advertised PPV event or product.

At Step 310, the Microprocessor 204 combines the received BUY command with identification information of the viewer (which is stored in memory resident in the Microprocessor 204 during initialization of the Television 10) and the embedded advertising data discussed above. The viewer identification information may include the viewer's credit card information for payment and billing purposes. At Step 312, the Cordless Telephone Base Unit 16 initiates the telephone call, connecting to the Central Site identified by the telephone number passed to Cordless Telephone Base Unit by the DTMF Circuit 14. The Microprocessor 204 of the Television 10 then sends the BUY command to the Cordless Telephone Base Unit 16 via DTMF Circuit 14 at Step 313. After the connection is established, the BUY command information is transferred to the Central Site at Step 314. At Step 316, the Central Site processes the BUY command and sends a confirmation message back to the Cordless Telephone Base Unit 16. Processing of the BUY command could include enabling the viewer to receive access to the scheduled PPV event or accepting an order for an advertised product. The Cordless Telephone Base Unit at Step 318 relays the confirmation message to the Television via the DTMF Circuit 14 and the Microprocessor 204. Next, at Step 320, the Microprocessor 204 of the Television 10 stores part or all of the confirmation message and displays part or all of the confirmation message on the Monitor 206. The viewer thus gets immediate feedback that the viewer's order for the event or product has been accepted. The confirmation message could also include information related to the PPV event or product such as the planned delivery date of the product. The Television then concludes the telephone call at Step 322 and processing ends at End Step 324.

In another preferred embodiment of the invention, the viewer may order a program or product which is not currently being advertised by accessing a series of menus. The Microprocessor 204 includes a Memory 205 (FIG. 4) for storing a telephone directory which includes a list of names for service providers, e.g., PPV program providers and home shopping channels, and a telephone number corresponding to each service provider. The Microprocessor 204 may also store in the Memory 205 additional viewer identification information such as the viewer's account number for a particular service provider.

Information regarding the service providers, including their names and associated telephone numbers, are transmitted by the Central Site 22 in the VBI and received by the Microprocessor 204. The Microprocessor creates a list of available service providers as they are received and assigns each service provider a Provider Reference Number 400 which is stored in the Memory 205. The service provider information may be transmitted by the cable company or by the individual service providers. The telephone directory may expand over time as information for new service providers are received by the Microprocessor.

Figure 7:
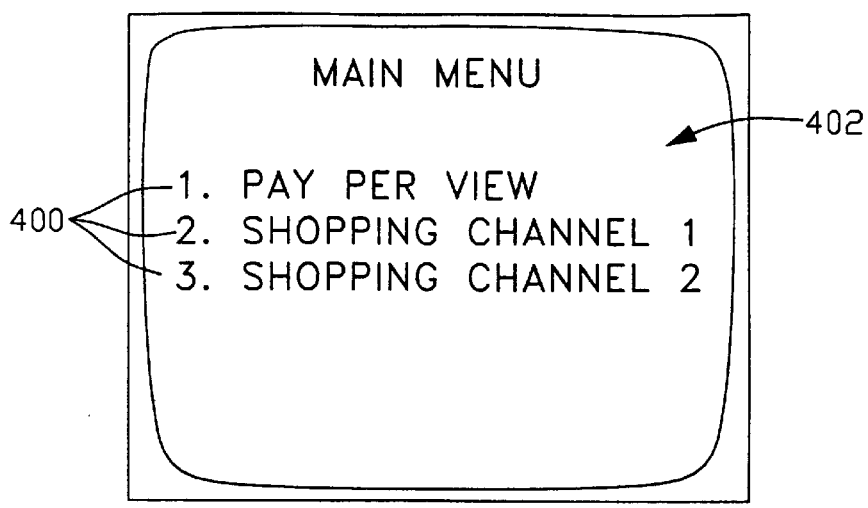
FIG. 7 is a schematic of a menu display for a list of service providers.

The Microprocessor 204 displays the list of service provider names with the associated Provider Reference Number in a Main Menu 402, as shown in FIG. 7, in response to the viewer pushing a MENU button provided on Keypad 214.

The Central Site 22 also transmits in the VBI a list of available items currently being offered by each service provider. Each item is identified by an associated Item Reference Number 404. Once in the Main Menu 402 and in response to the viewer pushing a number identifying one of the listed service providers, the Microprocessor displays on the Television 10 a Catalog Display 406 which includes a list of items available from that particular service provider and the corresponding Item Reference Number for each item, as shown in FIG. 8.

The viewer selects an item by pressing a button on the Keypad 214 corresponding to the Item Reference Number 404 for that item. Consequently, the Microprocessor 204 performs the steps 310 to End Step 324, illustrated in FIG. 6, but processes the Item Reference Number and stored service provider information rather than the BUY command and embedded advertising information to form a purchase command.

Figure 8:
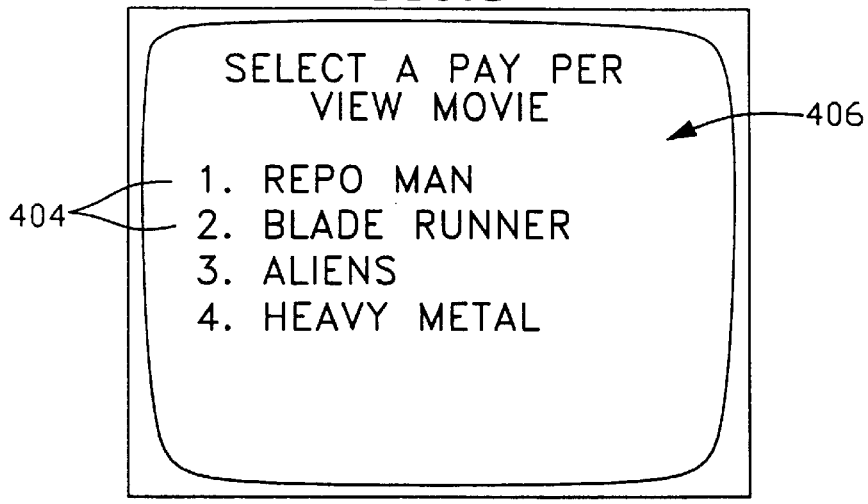
FIG. 8 is a schematic of a menu display for a list of available items from a selected service provider.

For example, if the viewer pushes the "1" button on the Keypad 214 while the Main Menu of FIG. 7 is displayed, the Microprocessor 204 will display the catalog of FIG. 8 on the Television 10. If the viewer then presses the "2" button, the Microprocessor will initiate the steps for ordering the PPV program "Blade Runner."

In an alternate preferred embodiment, the Microprocessor controls the DTMF Circuit to initiate a telephone call to a service provider immediately after it is selected from the Main Menu, but before an item is selected. In this manner, the time required to connect to the Central Site 22 after the order is placed is reduced.

In a further alternate preferred embodiment, the step of displaying and selecting a service provider from the Main Menu 402 can be eliminated from the purchasing sequence. According to this embodiment, the Microprocessor 204 displays the Catalog Display 406 for a particular service provider in response to the viewer pushing a LIST button on the Keypad 214 while the Television 10 is tuned to that service provider's broadcast, e.g., a home shopping channel program or an advertisement for a PPV program provider. In response to the viewer selecting an item, the Microprocessor combines the Item Reference Number with the service provider information embedded in the VBI and the stored viewer identification information to form a purchase command.

Many telephone lines include a call waiting feature which may interfere with the connection between the Central Site 22 and the Cordless Telephone Base Unit if a telephone call is incoming during the connection. According to further embodiment of the invention, the DTMF Circuit may be provided with the capability to identify an incoming call, and in cooperation with the Microprocessor, automatically disconnect from the Central Site 22 and reconnect when the line is not busy, thereby allowing the incoming call to be received by the Cordless Telephone Base Unit. Alternatively, the Microprocessor 204 may deactivate the call waiting feature by instructing the DTMF Circuit to transmit the appropriate call waiting disable code, such as "*70," when transmitting the tone signals to the Cordless Telephone Base Unit at the initiation of each telephone call to the Central Site 22. Preferably, the Microprocessor 204 displays prompts for the viewer during the initial setup of the Television 10 to enable a selected one of these alternatives.

Figure 9:
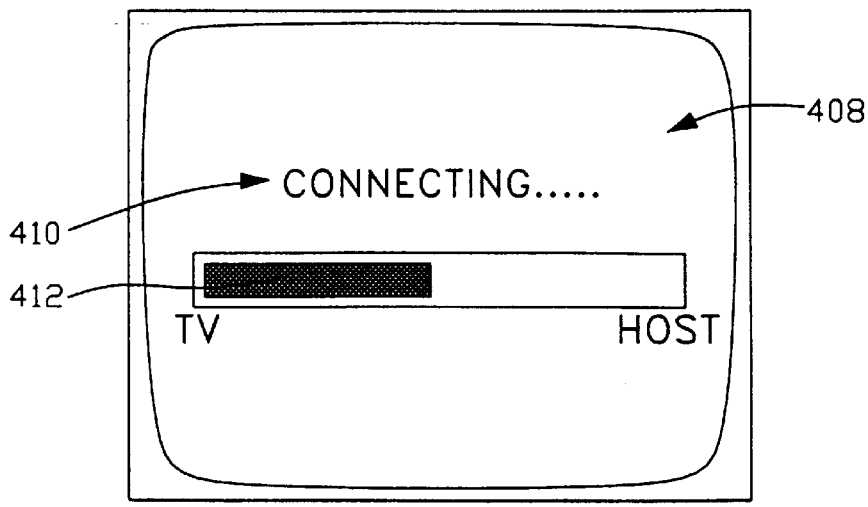
FIG. 9 is a schematic of a display to inform the viewer of the status of the telephone order.

In yet another embodiment, the Microprocessor 204 displays a Status Display 408 on the Television 10 while the Cordless Telephone Base Unit is connected to the Central Site 22 to inform the viewer of the status of the telephone connection and purchase order, as shown in FIG. 9. Preferably, the Status Display includes a Message 410 identifying the status of the connection, such as "Dialing", "Connecting", "Order Confirmed", or "Incoming Call", as well as a Graphical Representation 412 of the status of the telephone order.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patent is set forth in the appended claims.

What is claimed is:

1. A two-way transmission system between a data center and a plurality of television receivers, the system comprising:

a cordless telephone near each television receiver;

means for transmitting information related to a product being advertised on television including a telephone number via vertical blanking interval (VBI) of a television signal;

means at each television receiver for extracting the transmitted information related to the product being advertised on television from the VBI of the television signal;

a display monitor at each television receiver for displaying the extracted information related to the product being advertised;

means at each television receiver for transmitting and receiving information to and from the cordless telephone;

an input device for receiving user information from a user to be communicated to the data center;

means for connecting the cordless telephone to a public telephone network;

means for sending a signal to the cordless phone to initiate a call to the data center utilizing the telephone number;

means for connecting the data center to the telephone network for receiving the user information from the cordless telephone responsive to the extracted information related to a product being advertised; and means for receiving a confirmation message from the data center and displaying at least a portion of the received confirmation message on the display monitor.

2. A two-way information transmission method between a data center and a television receiver, the method comprising the steps of:

locating near the television receiver a cordless telephone;

transmitting information related to a product being advertised on television including a telephone number via vertical blanking interval (VBI) of a television signal;

extracting the information related to the product being advertised on television from the VBI of the television signal;

displaying the extracted information related to the product being advertised on a display monitor;

receiving user data from a user to be communicated to the data center responsive to the extracted information related to a product being advertised;

sending a signal to the cordless phone to initiate a call to the data center utilizing the telephone number;

accessing a public telephone network through the cordless telephone;

transmitting the user data from the television receiver to the cordless telephone utilizing a transmitter connected to the television receiver and compatible with the cordless telephone unit;

transmitting the user data from the cordless telephone to the data center via the telephone network; and receiving a confirmation message from the data center and displaying at least a portion of the received confirmation message on the display monitor.

3. A back link from a television receiver to a central data processing center comprising:

a cordless telephone capable of transmitting and receiving data;

means for connecting the cordless telephone to a public telephone network;

a wireless transmitter for transmitting data to the telephone for carriage by the telephone network to the data processing center;

a microprocessor electrically coupled to the television receiver for controlling the operation of the television receiver and electrically coupled to the transmitter for generating the transmitting data;

a data extractor for extracting information related to a product being advertised on television including a telephone number from vertical blanking interval (VBI) of a television signal;

a display monitor at each television receiver for displaying the extracted information related to the product being advertised;

an input device coupled to the microprocessor for accepting input data from the user and directing the microprocessor to generate user data responsive to the extracted information related to a product being advertised to be sent by the transmitter to the telephone for carriage by the telephone network to the data processing center utilizing the telephone number extracted from the VBI of the television signal; and means for receiving a confirmation message from the data center and displaying at least a portion of the received confirmation message on the display monitor.

4. The transmission system of claim 1, further comprising means for prompting the user on the display monitor to respond to the displayed information related to the product being advertised.

5. The transmission system of claim 1, further comprising means for combining identification information about the user stored in a memory at a respective television receiver with the user information input from input device and means for transmitting the combined information to the data center via the cordless telephone.

6. The method of claim 2, further comprising prompting the user on the display monitor to respond to the displayed information related to the product being advertised.

7. The method of claim 2, further comprising combining identification information about the user stored in a memory at a respective television receiver with the user information input from input device and transmitting the combined information to the data center via the cordless telephone.

8. The back link of claim 3, further comprising means for prompting the user on the display monitor to respond to the displayed information related to the product being advertised.

9. The back link of claim 3, further comprising means for combining identification information about the user stored in a memory at a respective television receiver with the user information input from input device and means for transmitting the combined information to the data center via the cordless telephone.

* * * * *